United States Patent [19]

Ong et al.

[11] Patent Number: 5,240,786
[45] Date of Patent: Aug. 31, 1993

[54] LAMINATED FUEL CELL COMPONENTS

[75] Inventors: Estela T. Ong, Chicago; Leonard G. Marianowski, Mt. Prospect, both of Ill.

[73] Assignee: Institute of Gas Technology, Chicago, Ill.

[21] Appl. No.: 850,569

[22] Filed: Mar. 13, 1992

[51] Int. Cl.$^5$ .............................................. H01M 8/02
[52] U.S. Cl. ...................................... 429/36; 29/623.2; 29/623.4; 427/115
[58] Field of Search .................... 429/35, 36; 29/623.2, 29/623.4; 427/115

[56] References Cited

U.S. PATENT DOCUMENTS

| | | | |
|---|---|---|---|
| 3,867,206 | 2/1975 | Trocciola et al. | 429/35 |
| 4,164,068 | 8/1979 | Shropshire et al. | 29/623.2 X |
| 4,259,389 | 3/1981 | Vine et al. | 429/36 X |
| 4,269,642 | 5/1981 | DeCasperis et al. | 156/89 |
| 4,365,008 | 12/1982 | DeCasperis et al. | 429/36 |
| 4,538,348 | 9/1985 | Vine et al. | 29/623.1 |
| 4,579,788 | 4/1986 | Marianowski et al. | 429/36 X |
| 4,652,502 | 3/1987 | Breault et al. | 429/13 |
| 4,659,635 | 4/1987 | Reiser et al. | 429/41 |
| 4,756,981 | 7/1988 | Breault et al. | 429/36 |
| 4,781,727 | 11/1988 | Mitsuda et al. | 429/35 X |
| 4,786,568 | 11/1988 | Elmore et al. | 429/44 |

*Primary Examiner*—Stephen Kalafut
*Attorney, Agent, or Firm*—Speckman, Pauley & Fejer

[57] ABSTRACT

An assembly of fuel cell components comprising a matrix tape having an active area and a peripheral wet seal area, an anode and/or a cathode in contact with a face of the matrix tape, the anode and cathode extending beyond a periphery of the active area of the matrix tape and contacting the peripheral wet seal area, and a portion of the peripheral wet seal area forming a frame around the anode and cathode to prevent gas crossover between the electrodes during cell operation and to prevent oxidation of the edges of the electrodes.

16 Claims, 1 Drawing Sheet

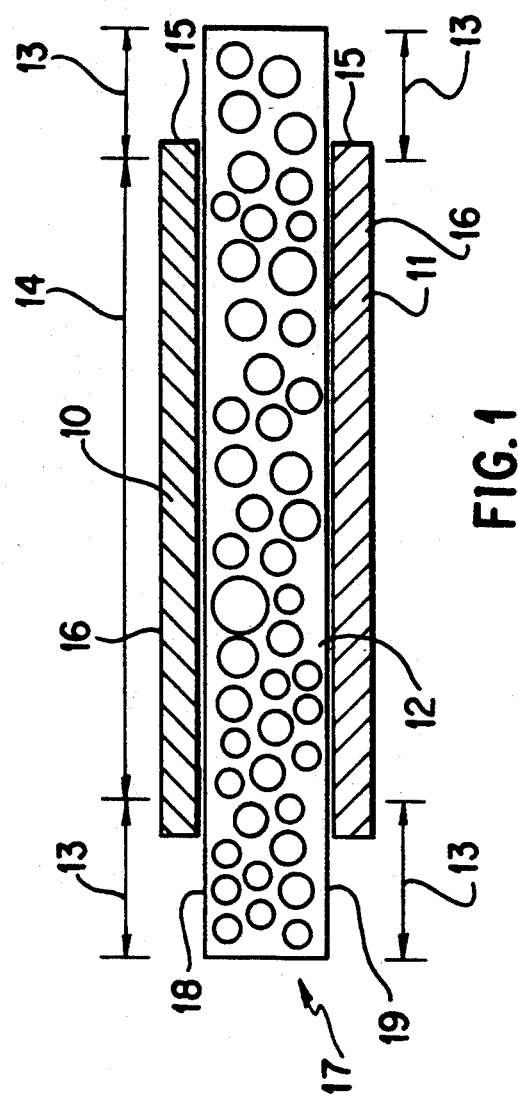
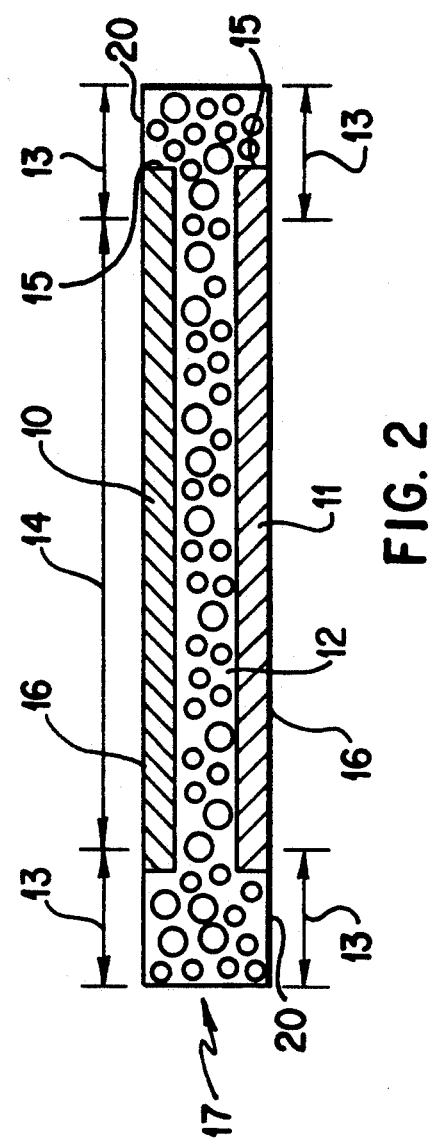

LAMINATED FUEL CELL COMPONENTS

BACKGROUND OF THE INVENTION

1. Field of the Invention

This invention relates to an assembly of components for a molten carbonate fuel cell comprising a laminate of at least one electrode and an electrolyte matrix and a process for making the assembly.

2. Description of the Prior Art

Known molten carbonate fuel cells consist of a cathode and an anode between which is disposed an electrolyte matrix tape formed from a slurry of lithium aluminate in an organic vehicle containing a plastic binder and additives that impart good slurry properties. The slurry is cast onto a flat Teflon ® substrate by a doctor blade and the organic solvent is allowed to evaporate. The dried tape is flexible as a result of the remaining plastic binder which is removed by thermal degradation after assembly of the fuel cell. Single or multi-piece matrix tapes are assembled in the fuel cell with a cathode on one side and an anode on the other side. The matrix is impregnated with molten carbonate, contained in an electrolyte tape or in the pores of the porous electrode, by capillary action during heat up of the fuel cell. As the fuel cell is heated, the plastic binder in the matrix is removed and the carbonate in the electrolyte tape or the electrode becomes molten and is wicked into the matrix The fuel cells are typically combined into a fuel cell stack and have positioned between them a separator plate which separates the anode of one fuel cell from the cathode of the adjacent fuel cell.

More specifically, a molten carbonate fuel cell consists of an electrolyte structure containing lithium aluminate and a mixture of alkali carbonates. A cathode and an anode are attached to the two faces of the matrix, one on each side thereof. Each electrode is contained within a metal plate compartment, the plate resembling a framed structure with a peripheral frame acting as a "wet seal". The electrodes fit within the "active area" which is the area inside the frame and the electrode height is flush with the "wet seal" frame. The matrix extends all the way to the outer edge of the "wet seal". At the fuel cell operating temperature of about 650° C., the molten electrolyte forms a seal against the "wet seal" frame to prevent gas leakage from the electrode compartments. Normally, the internal edges of the anode and cathode wet seal frames are aligned with each other.

U.S. Pat. No. 4,538,348 teaches casting electrolyte matrix tapes from a mixture of inert particles smaller than one micron, such as lithium aluminate, corrosion resistant ceramic particulates for crack resistance and a temporary plastic binder, all heated "in cell" to remove the binder. Upon cell assembly, active electrolyte is furnished by a prefilled anode.

There are several disadvantages associated with conventional fuel cell assembly and start-up. "In-cell" binder removal and electrolyte impregnation of the matrix requires a prolonged and carefully controlled process. In addition, the completed fuel cell requires the formation of a "wet seal" frame by the molten electrolyte with the peripheral frame of the metal plate compartment containing each electrode to prevent gas leakage into the electrode compartments. Finally, the clamping force applied to the cell easily causes cracking of the matrix resulting in gas crossover between electrodes.

Densification of at least the edge portions of fuel cell components is known for improving the gas edge seal for gas porous fuel cell components. U.S. Pat. No. 4,269,642 and related U.S. Pat. No. 4,365,008 teach an improved gas edge seal for gas porous fuel cell components and a process for fabricating such fuel cell components in which a fully graphitized gas porous, resin bonded carbon fiber sheath having edge portions which are more dense than a central portion is formed by forming an intermediate product comprising carbon fibers and a thermosetting resin which is not fully cured, the intermediate product having increased thickness along its edges, simultaneously densifying at least the edge portions by compressing them to a thickness which is substantially the same as the desired final thickness of the central portion of the components, curing the part and further heating the part to carbonize the resin and subsequently graphitize the resin and carbon fibers.

U.S. Pat. No. 4,652,502 and related U.S. Pat. No. 4,756,981 disclose a process for making porous plates for an electrochemical cell in which the peripheral edge regions of the plates are provided with smaller pores than the remainder of the plate and edge sealing is effected by a suspension of sealing material forced into the edge region producing an edge region having a higher density than the remaining plate. Similarly, U.S. Pat. No. 4,786,568 teaches an electrode plate assembly for use in a fuel cell power plant in which the edges of a porous substrate plate are densified by impregnating a suspension of finely divided material in the form of an "ink" into the interstitial spaces in the plate edges to form an integral filler band around a catalyst layer which has been previously applied to one surface of the substrate plate. A different approach is taught by U.S. Pat. No. 4,659,635 in which an improved porous matrix for containing molten carbonate electrolyte in a fuel cell stack consists of a substantially flat sheet of porous ceramic material having a generally smaller pore size average in the central body of the sheet and a generally larger second pore size average in the edge portion of the sheet, the larger pore sizes upon wetting with molten carbonate leaving void a major portion of the internal porosity.

SUMMARY OF THE INVENTION

It is an object of this invention to facilitate the assembly and start-up of a molten carbonate fuel cell and stack.

It is an object of this invention to provide an assembly of components for a molten carbonate fuel cell containing little or no organic binders to be burned off "in cell".

It is yet another object of this invention to provide an assembly of components for a molten carbonate fuel cell having a partly to fully impregnated matrix structure prior to insertion into a fuel cell.

It is yet another object of this invention to provide an assembly of components for a molten carbonate fuel cell in which gas leakage into the electrode compartments of the fuel cell is prevented.

It is yet another object of this invention to provide an assembly of components for a molten carbonate fuel cell in which the matrix is prevented from cracking at the wet seal/active area transition, thereby preventing gas crossover between the electrodes.

These and other objects are achieved in accordance with this invention in an assembly of fuel cell components comprising, in accordance with one embodiment of this invention, a composite active electrolyte-matrix tape comprising about 45 to about 85 volume percent active electrolyte distributed within and upon about 15 to about 50 volume percent matrix particles and having an active area and a peripheral wet seal area, an anode in contact with a face of the composite active electrolyte-matrix tape and/or a cathode in contact with an opposite face of the composite active electrolyte-matrix tape, the anode and cathode extending beyond the periphery of the active area of the composite active electrolyte-matrix tape and contacting the peripheral wet seal area thereof, and a portion of the peripheral wet seal area of the composite active electrolyte-matrix tape forming a frame around the anode and cathode whereby the face of the electrode facing away from the composite active electrolyte-matrix tape is flush with the frame formed by the peripheral wet seal area.

More specifically, the electrolyte matrix of the assembly of components for a fuel cell in accordance with this invention is in the form of a tape comprising a matrix of lithium aluminate and an active electrolyte comprising lithium carbonate and at least one carbonate selected from the group consisting of potassium carbonate and sodium carbonate cut to the exact size of an entire separator plate. The electrolyte matrix has an active area and a peripheral wet seal area surrounding the active area. The anode and the cathode, both of which are smaller than the electrolyte matrix, are positioned one on each face of the electrolyte matrix. The electrodes are sized such that when placed on the face of the electrolyte matrix, the peripheral edges of the electrodes extend beyond the active area of the electrolyte matrix and cover a portion of the peripheral wet seal area, forming a laminate structure. Upon heating this laminate structure to a temperature of 500° C. and applying a compaction force of 10–50 psi, the binder in the matrix is removed and the hot matrix is densified, forcing the electrodes to sink into the heat-softened matrix so that the completed cell has the exposed edges of the matrix acting as a wet seal against the metal plate surrounding the assembly and thus protects the electrode edges from oxidation.

In accordance with another embodiment of this invention, a matrix tape of lithium aluminate cut to the exact size of the entire fuel cell plate and having an active area and a peripheral wet seal area is disposed between an anode and a cathode, both of which are smaller than the matrix, but which extend beyond the active area of the matrix when in contact with the face of the matrix tape. The anode and/or the cathode is impregnated with mixed carbonate electrolyte which wicks into the matrix tape when the laminate structure is heated to a temperature of 500° C. and compacted to densify the hot matrix.

It will be apparent to those skilled in the art that partial laminate structures, in addition to the one piece laminate structure described hereinabove, may be used singly with other components or used together in a fuel cell. For example, a cathode/matrix laminate may be used with a separate anode; an anode/matrix laminate may be used with a separate cathode; a cathode/matrix laminate may be used with an anode/matrix laminate; a cathode/matrix laminate may be used with another matrix and a separate anode; and an anode/matrix laminate may be used with another matrix and a separate cathode.

A process for making a laminated fuel cell component in accordance with this invention comprises placing an anode adjacent one side of a composite active electrolyte-matrix tape and/or a cathode adjacent the opposite side of the composite active electrolyte-matrix tape, the composite active electrolyte-matrix tape having an active area and a peripheral wet seal area and the anode and/or cathode extending beyond a periphery of the active area and contacting the peripheral wet seal area, thereby forming a laminate structure. The laminate structure is heated to about 500° C. to remove the binder from the matrix tape. A compaction force of 10–50 psi is applied to the laminate structure at about 500° C. to densify the matrix, forcing the electrodes to sink into the heat-softened matrix. The compaction force is subsequently released and the matrix allowed to cool. It is an important feature of this invention that the entire processing of the laminate may be carried out "out-of-cell", thereby avoiding the prolonged and carefully controlled process required of in-cell processing.

BRIEF DESCRIPTION OF THE DRAWINGS

These and other objects and features of the invention will be apparent from the following detailed description of the invention read in conjunction with the drawings, wherein:

FIG. 1 is a cross-sectional side view of a laminate structure in accordance with one embodiment of this invention prior to heating and compaction; and FIG. 2 is a cross-sectional side view of a laminate structure in accordance with one embodiment of this invention after having been heated and compacted.

DESCRIPTION OF PREFERRED EMBODIMENTS

Laminate structure 17 in accordance with one embodiment of this invention is shown prior to assembly in FIG. 1. Laminate structure 17 comprises electrolyte matrix 12, preferably a composite active electrolyte-matrix tape formed as detailed below or a matrix tape formed from a slurry of lithium aluminate in an organic solvent containing a plastic binder and additives that impart good slurry properties. Electrolyte matrix 12 has a centralized active area designated by arrows 14 and a peripheral wet seal area designated by arrows 13. In accordance with a preferred embodiment of this invention, electrolyte matrix 12 is in the form of a composite active electrolyte-matrix tape comprising a matrix of lithium aluminate and an active electrolyte comprising a mixture of lithium carbonate and at least one carbonate selected from the group consisting of potassium carbonate and sodium carbonate distributed within and upon the matrix. The composite active electrolyte-matrix tape comprises about 45 to about 85 volume percent active electrolyte distributed within and upon about 15 to about 55 volume percent matrix particles. The active electrolyte and the matrix particles comprise about 30 to about 70 volume percent of the tape with about 30 to about 70 volume percent being void space.

In accordance with one embodiment of this invention, anode 11 is in contact with matrix face 19 of electrolyte matrix 12 and cathode 10 is in contact with opposite matrix face 18 of electrolyte matrix 12. Both anode 11 and cathode 10 extend beyond the periphery of active area of electrolyte matrix 12 designated by arrows 14 and contact the peripheral wet seal area of electrolyte matrix 12 designated by arrows 13.

In accordance with another embodiment of this invention, laminate structure 17 comprises only anode 11 in contact with matrix face 19 of electrolyte matrix 12 and in accordance with yet another embodiment of this invention, laminate structure 17 comprises only cathode 10 in contact with opposite matrix face 18 of electrolyte matrix 12.

Laminate structure 17 as shown in FIG. 1 is heated to a temperature of about 500° C. and subjected to pressures of about 10 to about 50 psi resulting in the configuration shown in FIG. 2.

As shown in FIG. 2, anode 11 and cathode 10 are embedded within electrolyte matrix 12. A portion of the peripheral wet seal area designated by arrows 13 of electrolyte matrix 12 forms frame 20 around anode 11 and cathode 10 such that when laminate structure 17 is positioned in a fuel cell, electrode edges 15 are not exposed to the atmosphere. In addition, where anode 11 and cathode 10 extend beyond the active area of matrix 12 designated by arrows 14 and contact the peripheral wet seal area of electrolyte matrix 12 designated by arrows 13, a seal is effected by that portion of the wet seal area which is in contact with the faces of anode 11 and cathode 10 facing electrolyte matrix 12. In contrast to conventional cell assembly where the electrodes fit completely within the active area of the matrix and are framed by the entire peripheral wet seal area thereby permitting gas crossover between electrodes when the matrix cracks in the areas of the edges of the anode and cathode, the portions of anode 11 and cathode 10 contacting the peripheral wet seal area of electrolyte matrix 12 and forming a seal therewith bridge the gap between the active area and wet seal area transition, thereby preventing gas crossover between anode 11 and cathode 10 in the event of matrix cracking.

In accordance with one embodiment of this invention, anode 11 and cathode 10 comprise a plurality of layers of electrodes to build up thickness around the active area of matrix 12. Anode 11 and cathode 10 have a preferred thickness of about 5 to about 50 mils.

In accordance with another embodiment of this invention electrolyte matrix 12 comprises a plurality of electrolyte matrix tapes laminated together. In accordance with yet another embodiment of this invention, electrolyte matrix 12 comprises a single electrolyte matrix tape. The preferred thickness of electrolyte matrix 12 is about 20 mils to about 120 mils.

In accordance with one embodiment of this invention, anode 11 and/or cathode 10 is impregnated with an active electrolyte comprising a mixture of lithium carbonate and at least one carbonate selected from the group consisting of potassium carbonate and sodium carbonate. During the heating and compaction of laminate structure 17, the active electrolyte wicks into the active area of matrix 12.

In a process for making a laminated fuel cell component in accordance with one embodiment of this invention, a composite active electrolyte-matrix tape is formed by mixing powders of active electrolyte material and high surface area matrix material; heating the mixture to above the melting point of the active electrolyte material forming a composite active electrolyte-matrix; cooling and grinding the composite active electrolyte-matrix to a fine powder; dispersing and milling the composite active electrolyte-matrix fine powder in a liquid with binder suitable for tape casting; degassing the dispersion of composite active electrolyte-matrix fine powder in a liquid with binder; casting the degassed dispersion of the composite active electrolyte-matrix fine powder in liquid into a tape; and evaporating the liquid to form a dry, flexible composite active electrolyte-matrix tape. A plurality of these tapes may be laminated together to form a single laminated composite active electrolyte-matrix tape of a suitable thickness for the desired fuel cell active electrolyte-matrix. Lamination may be achieved by rolling or pressing together multiple tapes or by multiple layer tape casting.

In accordance with another embodiment of this invention, electrolyte matrix 12 is in the form of tapes made from a slurry of lithium aluminate in an organic vehicle containing a plastic binder and the additives that impart good slurry properties. The slurry is cast onto a flat Teflon ® substrate by a doctor blade and the organic solvent is allowed to evaporate. The dried tape is flexible as a result of the remaining plastic binder.

To form laminate structure 17, anode 11 is placed adjacent one side of electrolyte matrix 12 having an active area and a peripheral wet seal area and/or cathode 10 is placed adjacent to the opposite side of electrolyte matrix 12 such that anode 11 and cathode 10 extend beyond the periphery of the active area of electrolyte matrix 12 in contact with the peripheral wet seal area, thereby forming laminate structure 17. Anode 11 and cathode 10 are cut to a size and planar geometry larger than the active area of electrolyte matrix 12 but smaller than the entire area of electrolyte matrix 12. Exact alignment of anode 11 and cathode 10 is not necessary and may not be desirable. However, both electrodes must not extend beyond the periphery of electrolyte matrix 12 and the width of any uncovered portion of electrolyte matrix 12 must be less than the width of the peripheral wet seal area of electrolyte matrix 12 to ensure that each electrode covers part of the peripheral wet seal area entirely around the active area of electrolyte matrix 12.

Laminate structure 17 thus formed is heated to a temperature of about 400° C. to about 650° C., causing electrolyte matrix 12 to soften. In accordance with one embodiment of this invention, electrolyte embedded within anode 11 and/or cathode 10 becomes molten and wicks into electrolyte matrix 12.

At a temperature of about 400° C. to about 650° C., a compaction force of about 10 to about 50 psi is applied to laminate structure 17 forcing anode 11 and cathode 10 to sink into softened electrolyte matrix 12. This compaction force is applied until the faces 14 of anode 11 and cathode 10 facing away from electrolyte matrix 12 are flush with a portion of the peripheral wet seal area of electrolyte matrix 12 extending beyond the periphery of anode 11 and cathode 10, the peripheral wet seal area forming frame 20 around anode 11 and cathode 10. In this manner, edges 15 of anode 11 and cathode 10 edges 15 of anode 11 and cathode 10 are protected from oxidation in the assembled fuel cell. When faces 16 of anode 11 and cathode 10 are flush with the peripheral wet seal area of electrolyte matrix 12, the compaction force is released and the now densified laminate structure 17 is cooled. Laminate structure 17 is then ready for incorporation into a fuel cell.

While in the foregoing specification this invention has been described in relation to certain preferred embodiments thereof, and may details have been set forth for the purpose of illustration, it will be apparent to those skilled in the art that the invention is susceptible to additional embodiments and that certain of the details described herein can be varied considerably without departing from the basic principles of the invention.

We claim:

1. An assembly of fuel cell components comprising:
   a composite active electrolyte-matrix tape comprising an active electrolyte distributed within and upon a matrix and having an active area and a peripheral wet seal area;
   at least one of an anode in contact with a face of said composite active electrolyte-matrix tape and a cathode in contact with an opposite face of said composite active electrolyte-matrix tape, said anode and said cathode extending beyond a periphery of said active area and contacting said peripheral wet seal area and said composite active electrolyte-matrix tape between said anode and said cathode being densified; and
   a portion of said peripheral wet seal area forming a frame around said anode and said cathode whereby an electrode face of said anode and said cathode facing away from said composite active electrolyte-matrix tape is flush with said frame.

2. An assembly of fuel cell components in accordance with claim 1, wherein said composite active electrolyte-matrix tape comprises a mixture of lithium carbonate and at least one carbonate selected from the group consisting of potassium carbonate and sodium carbonate.

3. An assembly of fuel cell components in accordance with claim 1, wherein said matrix comprises lithium aluminate.

4. An assembly of fuel cell components in accordance with claim 1, wherein said composite active electrolyte-matrix tape is about 20 to about 120 mils thick.

5. An assembly of fuel cell components in accordance with claim 1, wherein said composite active electrolyte-matrix tape is densified by a compaction force of about 10 to about 50 psi.

6. An assembly of fuel cell components in accordance with claim 1, wherein a tape periphery of said composite active electrolyte-matrix tape is equivalent to a cell periphery of a fuel cell.

7. An assembly of fuel cell components in accordance with claim 1, wherein said anode and said cathode have a thickness of about 5 to about 50 mils.

8. An assembly of fuel cell component comprising:
   a matrix tape having an active area and a peripheral wet seal area;
   at least one of an anode in contact with a face of said matrix tape and a cathode in contact with an opposite face of said matrix tape, said anode and said cathode extending beyond a periphery of said active area and contacting said peripheral wet seal area; and
   a portion of said peripheral wet seal area forming a frame around said anode and said cathode whereby an electrode face of said anode and said cathode facing away from said matrix tape is flush with said frame.

9. An assembly of fuel cell components in accordance with claim 8, wherein said matrix comprises lithium aluminate.

10. An assembly of fuel cell components in accordance with claim 8, wherein said anode and said cathode are porous structures impregnated with an active electrolyte.

11. An assembly of fuel cell components in accordance with claim 10, wherein said active electrolyte comprises a mixture of lithium carbonate and at least one carbonate selected from the group consisting of potassium carbonate and sodium carbonate.

12. An assembly of fuel cell components in accordance with claim 8, wherein said matrix tape is densified by a compaction force of about 10 to about 50 psi.

13. An assembly of fuel cell components in accordance with claim 8, wherein a tape periphery of said matrix tape is equivalent to a cell periphery of a fuel cell.

14. A process for making a laminated fuel cell component comprising:
   placing at least one of an anode adjacent one side of a composite active electrolyte-matrix tape having an active area and a peripheral wet seal area and a cathode adjacent the opposite side of said composite active electrolyte-matrix tape, said anode and/or said cathode extending beyond a periphery of said active area and contacting said peripheral wet seal area, forming a laminate;
   heating said laminate to a temperature of about 400° C. to about 650° C.;
   applying a compaction force to said laminate until said anode and/or said cathode are flush with a portion of said peripheral wet seal area, said portion of said wet seal area forming a frame around said anode and/or said cathode; and
   releasing said compaction force and cooling said laminate.

15. A process in accordance with claim 14, wherein a binder is removed from said composite active electrolyte-matrix tape during said heating of said laminate.

16. A process in accordance with claim 14, wherein said compaction force is between about 10 to about 50 psi.

* * * * *